Sept. 2, 1952  L. R. BUCKENDALE ET AL  2,609,213
PINTLE HOOK

Filed Oct. 7, 1948  3 Sheets-Sheet 1

INVENTORS
Lawrence R. Buckendale
Eli V. Elconin
By Strauch + Hoffman
Attorneys

Sept. 2, 1952     L. R. BUCKENDALE ET AL     2,609,213
PINTLE HOOK
Filed Oct. 7, 1948     3 Sheets-Sheet 2
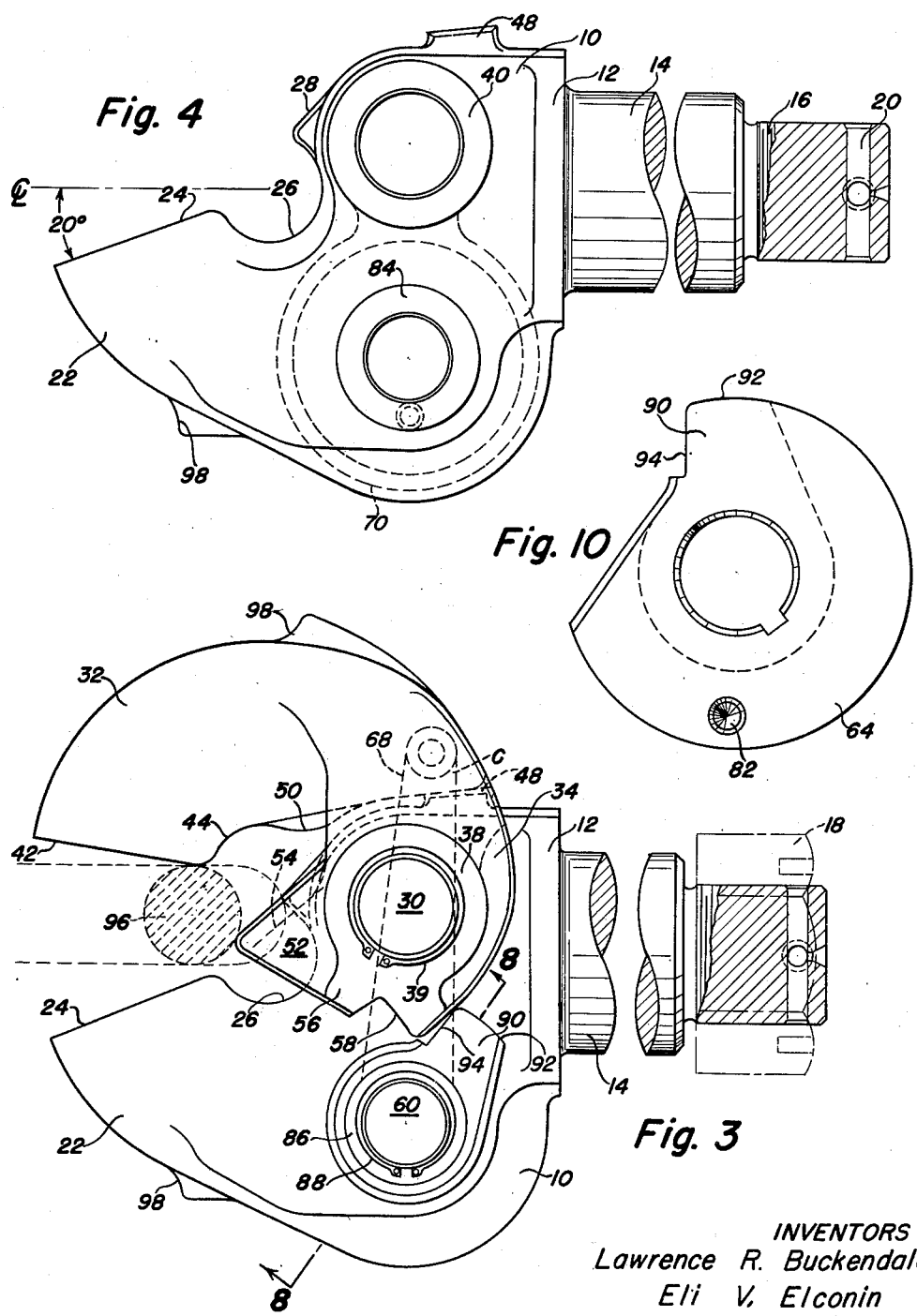
INVENTORS
Lawrence R. Buckendale
Eli V. Elconin
By Strauch & Hoffman
Attorneys

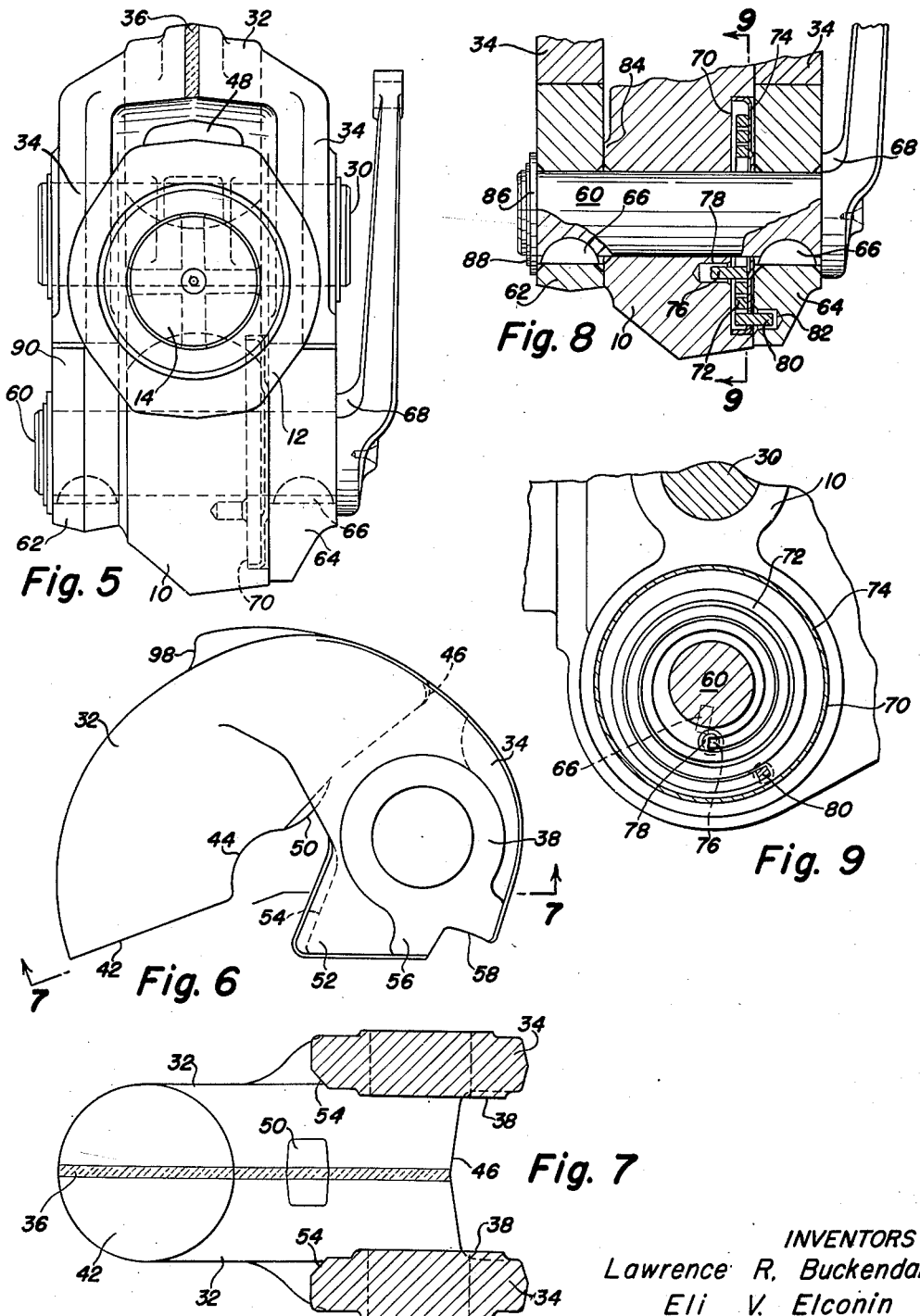

Patented Sept. 2, 1952

2,609,213

UNITED STATES PATENT OFFICE 2,609,213

PINTLE HOOK

Lawrence R. Buckendale and Eli V. Elconin, Detroit, Mich., assignors to The Timken-Detroit Axle Company, Detroit, Mich., a corporation of Ohio Application October 7, 1948, Serial No. 53,262

7 Claims. (Cl. 280—33.15)

This invention relates to pintle hooks and has for its general object and purpose to provide a device of this kind of very rugged construction particularly designed as a coupling for artillery carriages or other heavy duty vehicles.

One of the important objects of the invention is to provide a pintle hook comprising stationary and movable hook sections of novel construction, together with means for securely latching the movable hook section in its closed position and which also yieldingly holds said hook section in its fully open position.

A further object of the invention resides in the provision of a novel construction and arrangement of a pivoted pintle hook section with respect to rockable spring held latching means therefor and means on said pivoted hook section to receive the impact of a coupling ring or lunette by which said hook section is moved from its open to its closed position and the coupling ring guided or directed to proper position for engagement by seating surfaces on the stationary and movable hook sections.

Another detail object of the invention is to provide latching members fixed to opposite ends of a shaft journalled in the body of the stationary hook section and biased in one direction by a spiral spring into engagement with means formed on spaced arms of the movable hook section to immovably hold the latter in its closed position, said latch members also coacting with said arms to yieldingly urge the hook member to its full open position.

With the above and other objects in view, the invention comprises the improved pintle hook, and the construction and relative arrangement of the several parts as will hereinafter be more fully described, illustrated in the accompanying drawings and subsequently defined in the subjoined claims.

In the drawings, wherein one preferred embodiment of the invention is disclosed and in which similar reference characters designate corresponding parts throughout the several views:

Figure 3 is a side elevation similar to Figure 2, showing the pivoted pintle hook section in open position;

Figure 4 is a detail side elevation of the body member and the stationary hook section;

Figure 5 is a rear end elevation;

Figure 6 is a detail side elevation of the pivoted hook section;

Figure 7 is a horizontal sectional view taken substantially on the line 7—7 of Figure 6;

Figure 8 is a detail transverse sectional view taken substantially on the line 8—8 of Figure 3;

Figure 9 is a vertical sectional view taken substantially on the line 9—9 of Figure 8; and Figure 10 is a detail side elevation of the latch member on the opposite end of the rock shaft to that shown in Figures 2 and 3.

Figure 2:
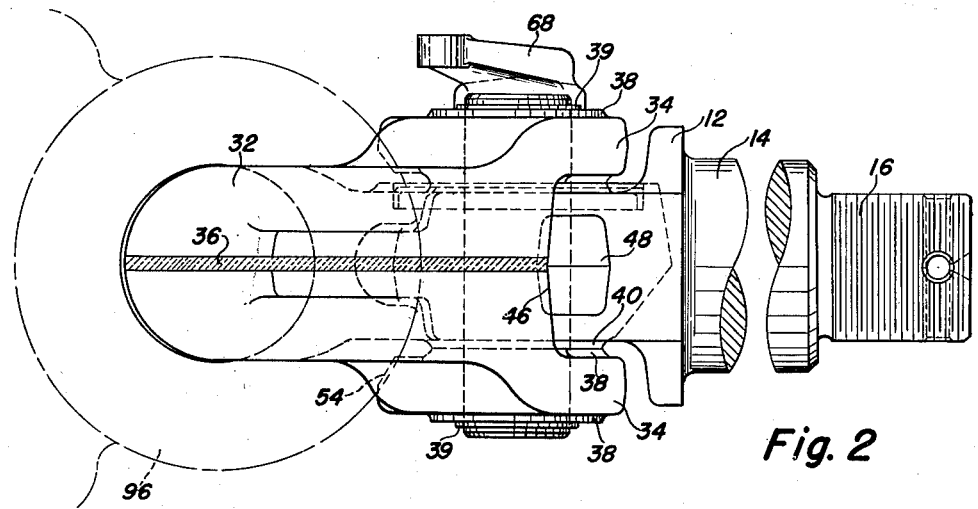
Figure 2 is a top plan view thereof.

Referring in further detail to the drawings the body member 10 of the pintle hook is of general rectangular form and at its rear side is provided with a flange 12 for abutting contact with the frame of a vehicle. A cylindrical shank 14 projects axially from the flange 12 and terminates in a reduced threaded extension 16 to receive the retaining nut 18. The nut may be suitably recessed to receive the ends of a locking pin disposed through diametrically extending openings 20 in the end of the threaded extension 16.

The lower portion of the body member 10 is formed with a forwardly and upwardly curved hook section 22. This hook section is of cylindrical form and the circular end face 24 thereof is preferably disposed below and at an angle of substantially 20 degrees with respect to the longitudinal center line of the shank 14 which intersects the center of curvature of the ring receiving seat 26 formed on body member 10 at the upper side of the hook section 22. Above this seat an abutment lug 28 is formed upon the body member of the hook, the lower curved surface thereof being a continuation of the surface of the ring seat 26.

Rearwardly of the ring seat 26 the upper portion of the body member 10 is provided with a cylindrical opening in which a shaft 30 is rotatably journalled. The opposite ends of this shaft projecting beyond the body member 10 have a driving fit in openings formed in transversely spaced arms 34 on the rear end of a movable hook section 32. Preferably, this hook section is a two part steel forging, said parts being permanently and rigidly united at their contacting faces by a continuous weld 36. Each of the arms 34 has bosses 38 formed on its inner and outer side faces around the shaft openings therein, the bosses 38 on the inner faces of said arms having rotative contact with the annular bosses 40 formed on the opposite side faces of the body member 10. The hook section 32 and shaft 30 are held against relative axial displacement by the split locking rings 39 seated in peripheral grooves in the ends of shaft 30 and engaged with the faces of the outer bosses 38 on the arms 34.

The forward end of the hook section 32 is downwardly curved on the same radius as the upwardly curved end of stationary hook section 22 and the circular end face 42 thereof is adapted to contact the end face 24 of hook section 22 in accurately registering relation therewith when the movable hook section is in closed position. The inner seating surface 44 on the hook section 32 is of somewhat smaller radius than the seating surface 26 of the stationary hook section and substantially the same as that of the coupling ring or lunette.

The rear end face of the hook section 32 between the arms 34 thereof extends at a predetermined angle and in spaced relation to the body member 10 from the seating surface 44 to the top surface of said hook section, at which latter point the edge 46 of the hook section is adapted to contact a stop pad 48 formed on the top surface of body member 10 to limit the pivotal movement of hook section 32 to its full open position. At the opposite or lower end of the inclined face of the hook section 32 a protuberance 50 is centrally formed thereon as seen in Figure 7 having a convex surface, merging into the concave seating surface 44 of said hook section.

Below the shaft 30, each arm 34 of hook section 32 is formed with a forwardly projecting nose 52 of substantially triangular form. The front vertically inclined face of each nose 52 is located in predetermined relation from the end face 42 and seat 44 of the hook section and is transversely beveled or inclined inwardly toward the side face of the body member 10, as shown at 54. At the rear side of each nose 52, the boss 38 on arm 34 is radially extended to provide a reinforced lug 56 and an arcuately curved abutment face 58 extending rearwardly therefrom.

Below the arms 34 of the hook section 32, a transverse rock shaft 60, axially parallel with the shaft 30, is journalled in the body member 10. To the opposite ends of this rock shaft latch members 62 and 64 respectively are non-rotatably fixed by means of suitable keys 66. The member 64 is held against axial movement on the shaft between one side face of the hook body 10 and operating lever 68 extending upwardly from the end of the shaft. The adjacent side face of the body 10 is provided with a circular recess 70 to receive a spring 72 preferably housed within a cupped metal plate 74. One end 76 of the spring is angularly bent in one direction and received in a socket 78 in the base wall of the recess 70 while the other end 80 of said spring is angularly extended in the opposite direction through an opening in the housing plate 74 and into a socket or recess 82 formed in the inner side face of the latch member 64.

The other latch member 62 is confined against axial movement on the shaft 60 between an annular boss 84 formed on the side face of the body member 10 and the washer 86 on the shaft held in contact with the outer side face of member 62 by a split locking ring 88 seated in a peripheral groove in said shaft.

Figure 1:
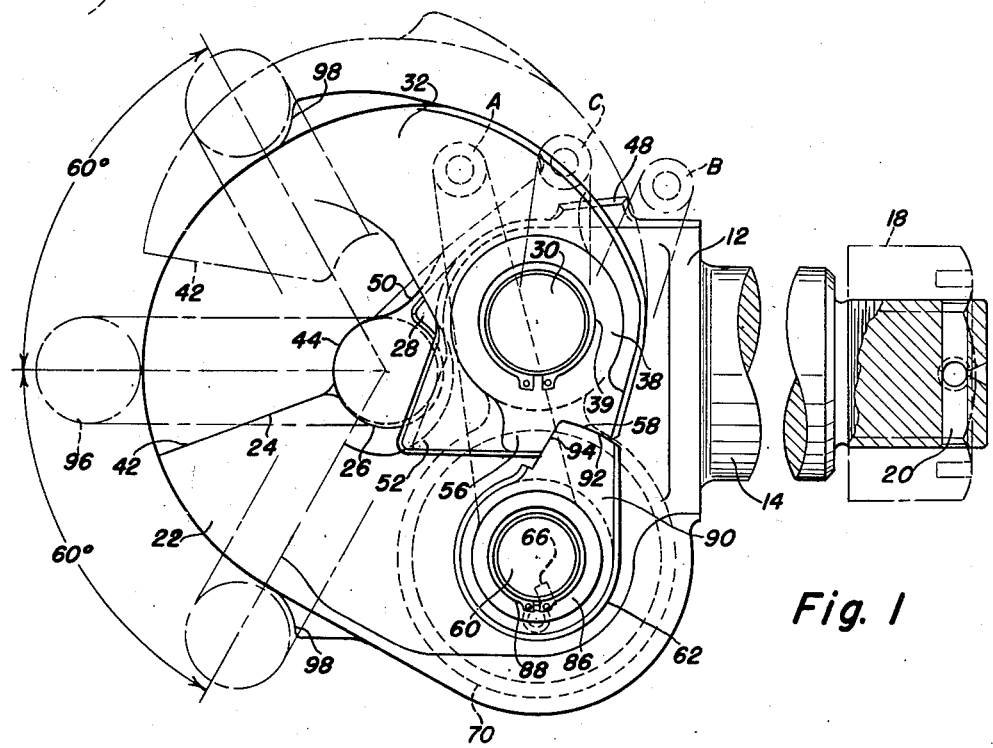
Figure 1 is a side elevation showing the pintle hook in closed position.

Each of the latch members 62 and 64 is provided with an upwardly extending tapering latch tongue 90. The end face 92 of this tongue and the abutment face 58 on the associated arm 34 of hook section 32 are curved concentrically to shaft 60 while the front inclined side face 94 of the latch tongue closely contacts the rear inclined face of lug 56 on said arm when the hook section 32 is in its closed position, as seen in Figure 1 of the drawings. The spiral spring 72 acts to normally bias the latch members to this position so that said members will immovably hold the section 32 of the pintle hook against pivotal movement toward its open position and with the end face 42 thereof in substantial contact with the end face 24 of the stationary hook section.

The latch members 62 and 64 are actuated from the driver's cab of the vehicle to which body member 10 is attached by means of a lanyard or other suitable operating connection with the upper end of lever 68. As seen in the Figure 1 of the drawings, this lever may be moved from a normal position A in which the hook is closed to an extreme position B in which maximum torque is stored in the spring 72. Movement of the lever to the intermediate position C, as seen in Figure 3 of the drawings, imparts a rocking motion to the shaft 60 to position the end faces 92 of the latch tongues 90 rearwardly of the abutment faces 58 on the arms 34 of hook section 32. When the pull on lever 68 is now released, the reaction of the spring 72 rotates the latch members in a counterclockwise direction. Thus after the hook section 32 has been pivotally rocked in the clockwise direction by the outward movement of the coupling ring or lunette, indicated at 96, which is attached to the trailer vehicle, the latch tongue faces 94 will then bear against the rear side faces of the arms 34 and yieldingly urge the hook section 32 to its full open position in contact with the stop pad 48. This is the minimum open position of hook section 32 which is necessary to permit the entrance of the coupling ring 96 between the two hook sections and effect the operation of hook section 32 to its closed position. As seen in Figure 3, in the open position of hook section 32 the nose portions 52 of the arms 34 extend forwardly of the ring receiving seat 26 at opposite sides thereof. In coupling the two vehicles, the ring or lunette 96 is entered between the spaced end faces 24 and 42 of the two hook sections and contacts the abutment lug 28 on body member 10 and the inner inclined side faces 54 of the nose portions 52 on arms 34 at the apex thereof, and in transversely spaced relation from the abutment 28 and the longitudinal center line of body member 10. Thus the impact pressure of the coupling ring 96 against the bevelled faces 54 rocks the pivoted hook section 32 in counterclockwise direction toward its closed position and against the resistance of the spiral spring 72 until the rear side faces of arms 34 move above and out of contact with the latch tongue faces 94. During this closing movement of hook section 32, the protuberance 50 thereon bears on the upper side of the ring or lunette 96 to guide and direct the same downwardly and inwardly upon the seat 26 on the lower stationary hook section. At the end of this closing movement and upon contact of the end face 42 of hook section 32 with the end face 24 of hook section 22, the spring 72 then returns the latch members to normal position, in which the latch tongue faces 92 have closely engaged contact with the abutment surfaces 58 and the lugs 56 on the arms 34. It will thus be seen that the pintle hook is positively held in closed position and cannot be opened to release the coupling ring or lunette 96 except by positive actuation of the spring held latching members 62 and 64. The tendency of the hook section 32 to open holds the latch members firmly in position. These latching members also hold the pivoted hook member in its full open position for the automatic coupling or connection of the pintle hook with the ring or lunette in the manner above described.

From the above description, it will be seen that the present invention provides a pintle hook of very simple and exceedingly rugged construction for use in connection with heavy duty vehicles and in which a secure coupled connection of the vehicles may be quickly effected with the rapid release of such connection by the movement of one of the vehicles relative to the other. Preferably the hook members 22 and 32 are provided in properly spaced relation from their ends with abutment or stop lugs 98 to limit the relative pivotal movement of the pintle hook and the coupling ring or lunette when the parts are in coupled relation.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A pintle hook comprising a body member having a stationary hook section, a complementary hook section having spaced arms straddling said body member and pivotally mounted thereon, a forwardly projecting nose portion on each of said arms to be contacted by a coupling ring and move the pivoted hook section from open toward closed position, said hook sections having inner seating surfaces for engagement by a coupling ring and said body member having an abutment projecting forwardly over the seating surface of the stationary hook section, said pivoted hook section between the arms thereof being provided with a protuberance having a convex surface merging into the seating surface of said hook section for directing a coupling ring to its coupled position in the closing movement of said pivoted hook section, and manually operable latching means mounted on said body member coacting with means on at least one of said arms to immovably hold the pivoted hook section in closed position relative to the stationary section.

2. A pintle hook comprising a body member having a stationary hook section, a complementary hook section having spaced arms straddling said body member and pivotally mounted thereon, each of said hook sections having a coupling ring receiving seat, said arms having forwardly projecting nose portions receiving impact from a coupling ring to move the pivoted hook section to its closed position, means for limiting movement of the pivoted hook section to open position, and latching means for said pivoted hook section comprising a rock shaft mounted in the body member, latch tongues fixed to said shaft at opposite sides of the body member coacting with recesses on the rearward sides of the respective arms of said pivoted hook section, and spring means resiliently engaging one of said latch tongues biasing said rock shaft and latch tongues in one direction to normal position latching the pivoted hook section against movement from its closed position, and said latch tongues coacting with said arms under the action of said spring means to yieldingly urge the pivoted hook section to its full open position.

3. The pintle hook as defined in claim 2 in which said body member is provided with a circular recess in one side concentric to said rock shaft and said spring means comprises a spirally coiled torsion spring and a housing member therefor mounted within said recess, said spring having reversely extending end portions parallel with the rock shaft and connected respectively with said body member and said one of said latch tongues.

4. A pintle hook comprising a relatively stationary body having a hook section, a complementary hook section having spaced arms straddling said body and pivotally mounted on opposite sides of said body, each of said arms having a forwardly projecting nose to receive the impact of a coupling ring and move the pivoted hook section from open toward closed position, inwardly sloping surfaces on each of said projecting noses to guide said coupling ring into seated position, rigidly connected pivoted latch members on opposite sides of said body adapted to cooperate with latch formations on opposite sides of said complementary hook section in the closed position of said pintle hook, a lever for manual operation of the latch secured to said latch members, and a spring biasing said latch members and lever toward operative latching position.

5. In the pintle hook defined in claim 4, a recess between said body and one of said latch members providing an enclosed spring housing wherein said spring is mounted with one end fixed to said body and the other end secured to said one latch member.

6. A pintle hook comprising a body having a stationary hook section, a complementary hook section having spaced arms straddling said body and pivotally mounted thereon, each of said hook sections having a coupling ring receiving seat, said arms having forwardly projecting nose portions receiving impact from a coupling ring to move the pivoted hook section to its closed position, means limiting movement of the pivoted hook section to open position, and a latch for said pivoted hook section comprising a rock shaft mounted on the body, latch members fixed to said shaft at opposite sides of the body cooperating with the respective arms of said pivoted hook section, and spring means biasing said rock shaft and latch members in one direction to normal position latching the pivoted hook section against movement from its closed position, said body having a recess in one side surrounding said rock shaft and said spring means comprising a spring housed within said recess with one end connected to the body and its other end connected with the adjacent latch member, and said latch members coacting with said arms under the action of said spring means to yieldingly urge the pivoted hook section to its full open position.

7. A pintle hook comprising a body member having a stationary hook section, a complementary hook section having spaced arms straddling said body member and pivotally mounted thereon, each of said hook sections having a coupling ring receiving seat, a nose portion projecting forwardly from each of said arms to receive the impact of the coupling ring and move said pivoted hook section from an open to a closed position relative to the stationary hook section, ring guiding surfaces on each of said arms beveled inwardly toward said seat to guide the ring on said ring receiving seat, and manually operable means mounted on said body and coacting with means on at least one of said arms to immovably latch the pivoted hook section in its closed position.

LAWRENCE R. BUCKENDALE.
ELI V. ELCONIN.

REFERENCES CITED

The following references are of record in the file of this patent:

UNITED STATES PATENTS

| Number | Name | Date |
|---|---|---|
| 2,124,839 | Weiss | July 26, 1938 |
| 2,397,558 | Mennen | Apr. 2, 1946 |
| 2,426,532 | Tierney | Aug. 26, 1947 |

FOREIGN PATENTS

| Number | Country | Date |
|---|---|---|
| 632,969 | France | Jan. 18, 1928 |